United States Patent
Katusic et al.

(10) Patent No.: US 7,371,337 B2
(45) Date of Patent: May 13, 2008

(54) ZINC OXIDE POWDER AGGREGATES PRESENT IN CIRCULAR, ELLIPSOIDAL, LINEAR AND BRANCHED FORM

(75) Inventors: Stipan Katusic, Kelkheim (DE); Michael Kraemer, Schoeneck-Kilianstaedten (DE); Peter Kress, Karlstein (DE); Horst Miess, Kahl (DE); Guido Zimmermann, Hanau (DE); Peter Albers, Hanau (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 10/572,936

(22) PCT Filed: Sep. 2, 2004

(86) PCT No.: PCT/EP2004/009752

§ 371 (c)(1),
(2), (4) Date: Mar. 22, 2006

(87) PCT Pub. No.: WO2005/028565

PCT Pub. Date: Mar. 31, 2005

(65) Prior Publication Data

US 2007/0037699 A1    Feb. 15, 2007

(30) Foreign Application Priority Data

Sep. 22, 2003 (DE) ................ 103 43 728

(51) Int. Cl.
*H01B 1/00* (2006.01)
*H01B 1/12* (2006.01)
*C01G 9/02* (2006.01)
(52) U.S. Cl. ............... 252/500; 106/604; 106/753; 524/432; 524/430; 423/419.1; 423/206.2; 423/622; 424/59; 502/323

(58) Field of Classification Search ............... 252/500; 428/402; 423/326, 622, 419.1, 206.2; 524/432, 524/430; 106/604, 753; 424/59; 502/323
See application file for complete search history.

(56) References Cited

U.S. PATENT DOCUMENTS 4,394,488 A * 7/1983 Kim et al. ................ 524/432
(Continued)

FOREIGN PATENT DOCUMENTS

| GB | 435005 | * | 9/1935 |
| JP | 04-164814 | * | 6/1992 |
| JP | 2004-115325 | * | 4/2004 |
| WO | 03/080515 | | 10/2003 |

OTHER PUBLICATIONS

U.S. Appl. No. 11/612,112, filed Dec. 18, 2006, Zimmermann, et al.

*Primary Examiner*—Mark Kopec
*Assistant Examiner*—Khanh Tuan Nguyen
(74) *Attorney, Agent, or Firm*—Oblon, Spivak, McClelland, Maier & Neustadt, P.C.

(57) ABSTRACT

Pyrogenically prepared zinc oxide powder having a BET surface area of from 10 to 200 $m^2/g$, which is in the form of aggregates, the aggregates being composed of particles having different morphologies, and 0-10% of the aggregates being in a circular form, 30-50% being in an ellipsoidal form, 30-50% being in a linear form and 20-30% being in a branched form. It is prepared by reacting a starting mixture containing zinc vapour, a combustible gas and steam or a mixture of steam and carbon dioxide in a flame with an oxygen-containing gas in an oxidation zone, cooling the hot reaction mixture in a quenching zone and separating the solid material from the gas stream, the amount of oxygen in the oxidation zone being greater than the amount necessary for the complete oxidation of the combustible gas and the zinc vapour. The zinc oxide powder can be used as a constituent of sun protection compositions for protection against UV radiation.

8 Claims, 4 Drawing Sheets

U.S. PATENT DOCUMENTS

| | | | |
|---|---|---|---|
| 5,102,650 A * | 4/1992 | Hayashi et al. | 423/622 |
| 5,391,354 A * | 2/1995 | Petersen et al. | 422/129 |
| 5,441,726 A | 8/1995 | Mitchnick et al. | |
| 5,518,812 A * | 5/1996 | Mitchnick et al. | 428/357 |
| 5,527,519 A * | 6/1996 | Miksits et al. | 423/622 |
| 5,582,771 A * | 12/1996 | Yoshimaru et al. | 252/519.53 |
| 5,635,154 A * | 6/1997 | Arai et al. | 423/263 |
| 5,849,063 A * | 12/1998 | Myerson et al. | 75/416 |
| 5,876,688 A * | 3/1999 | Laundon | 423/622 |
| 6,200,680 B1 * | 3/2001 | Takeda et al. | 428/402 |
| 6,335,002 B1 * | 1/2002 | Kogoi et al. | 424/63 |
| 6,416,862 B1 * | 7/2002 | Kogoi et al. | 428/402 |
| 6,548,168 B1 * | 4/2003 | Mulvaney et al. | 428/402 |
| 7,186,393 B2 * | 3/2007 | Kogoi et al. | 423/326 |
| 2003/0228248 A1 * | 12/2003 | Kwon et al. | 423/263 |
| 2005/0069506 A1 | 3/2005 | Katusic et al. | |
| 2005/0182174 A1 | 8/2005 | Michael et al. | |
| 2006/0073092 A1 | 4/2006 | Katusic et al. | |
| 2007/0037699 A1 | 2/2007 | Katusic et al. | |

* cited by examiner

ZINC OXIDE POWDER AGGREGATES PRESENT IN CIRCULAR, ELLIPSOIDAL, LINEAR AND BRANCHED FORM

The invention relates to a zinc oxide powder, its preparation and use.

Zinc oxide powders are used in inks, surface coatings, in resins and fibres. An important sector is the use of zinc oxide powders in the cosmetic field, especially as a constituent of sun protection formulations.

There are in principle two possibilities for synthesising zinc oxide powders, wet-chemical processes and gas-phase processes. In general, the zinc compounds used as starting material in wet-chemical processes are those which can be converted into zinc oxide by means of heat, such as, for example, zinc hydroxide, zinc oxalate or zinc carbonate. The wet-chemical method usually has the disadvantage that the zinc oxide particles produced agglomerate to form larger units, which are undesirable especially in cosmetic applications. In addition, impurities resulting from process and starting materials cannot be removed from the finished product or can be removed only with great difficulty.

The process, which is usually carried out as a batch process, comprises filtering, drying and, optionally, grinding the particles and is relatively cost-intensive.

Gas-phase processes or pyrogenic processes permit a more inexpensive process. They include the French and American processes, according to which zinc oxide can be produced on a large scale.

In both processes, oxidation of zinc vapour is carried out. Disadvantages of these processes are the formation of large aggregates of primary particles and a low BET surface area.

The prior art describes various possibilities for gas-phase synthesis with the aim of achieving a higher BET surface area, better transparency and higher UV protection.

Ultimately, a common feature of all these attempts is the oxidation of zinc vapour.

JP 56-120518 describes the oxidation of zinc vapour using air or oxygen, with the formation of non-aggregated, needle-like zinc oxide particles. Such particles can often be incorporated into sun protection formulations only with difficulty.

U.S. Pat. No. 6,335,002 describes the oxidation of zinc vapour using air or oxygen. By varying the process parameters, primary particles of zinc oxide which are largely isotropic in form and have a low degree of aggregation should be formed. In the examples according to the invention of U.S. Pat. No. 6,335,002, the aggregate diameters are from 0.47 to 0.55 µm. The zinc oxide powder has a BET surface area of from 10 to 200 m$^2$/g and a tamped density of from 4 to 40 ml/g.

The oxidation of the zinc vapour is carried out in an atmosphere of an oxidising gas which contains oxygen and steam. Such an atmosphere can also be produced by burning an oxygen-containing gas with hydrogen or propane, an excess of oxygen being used. Zinc vapour and the oxygen/steam mixture are injected separately by means of nozzles into a reactor, in which the oxidation takes place.

Overall, the prior art, irrespective of the preparation, offers numerous types of zinc oxide in the form of needles, spheres, tetrahedrons, rods and flocks, as listed, for example, in U.S. Pat. No. 5,441,226.

The prior art demonstrates the keen interest in zinc oxide, especially in its use as UV protection in sun protection formulations.

The object of the invention is to provide a zinc oxide powder which avoids the disadvantages of the prior art. In particular, it should exhibit high transparency while providing good UV protection. It should also be readily incorporable into dispersions. A further object is to provide a process for the preparation of zinc oxide powder.

The invention provides a pyrogenically prepared zinc oxide powder having a BET surface area of from 10 to 200 m$^2$/g, characterised in that it is in the form of aggregates, the aggregates being composed of particles having different morphologies, and 0-10% of the aggregates being in a circular form, 30-50% of the aggregates being in an ellipsoidal form, 30-50% of the aggregates being in a linear form, 20-30% of the aggregates being in a branched form.

Within the scope of the invention, particles are understood as being the particles formed primarily in the pyrogenic preparation process. They join together during the reaction, with the formation of sintering surfaces, to form aggregates. It is important that the aggregates are composed of particles having different morphologies. According to the definition, an aggregate is composed of particles which are the same or approximately the same, the primary particles (DIN 53206).

The zinc oxide powder according to the invention, on the other hand, contains aggregates which consist of particles having different morphologies, and are therefore not designated primary particles. Morphology is understood as meaning both isotropic and anisotropic particles. There may be, for example, spherical or largely spherical particles, bulb-like particles, rod-shaped particles or needle-shaped particles. It is important that the aggregates consist of different particles, and the particles are joined together by sintering surfaces.

The BET surface area of the powder according to the invention may be from 20 to 60 m$^2$/g.

Figure 1A:
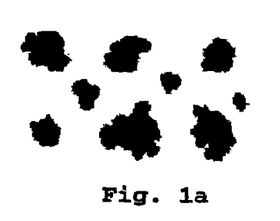
FIGS. 1a-c. Show typical forms of ellipsoidal, linear and branched aggregates of the zinc oxide powder according to the invention.
Figure 1B:
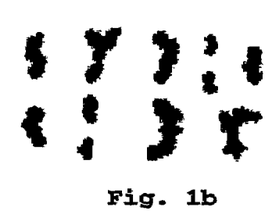
Figure 1C:
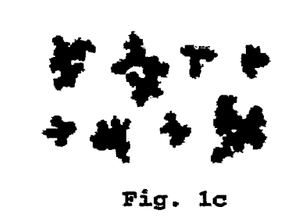

The aggregates of the zinc oxide powder according to the invention are in circular, ellipsoidal, linear and branched forms. FIGS. 1a-c show typical forms of ellipsoidal, linear and branched aggregates of the zinc oxide powder according to the invention.

Figure 2:
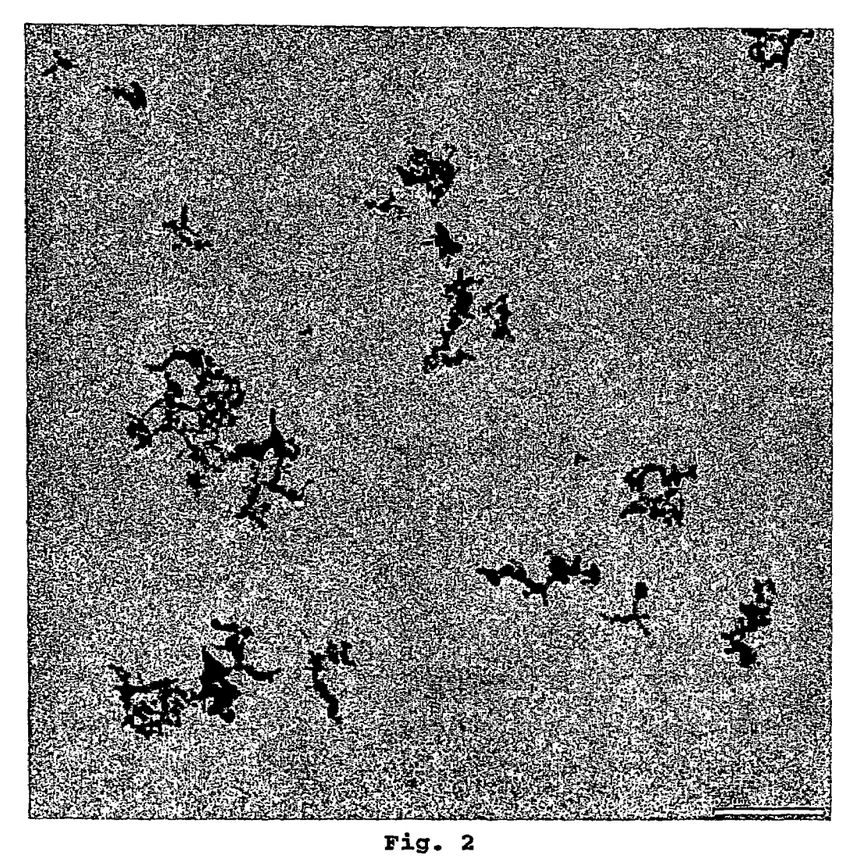
FIG. 2. Shows a TEM image of the powder according to the invention.
Figure 3A:
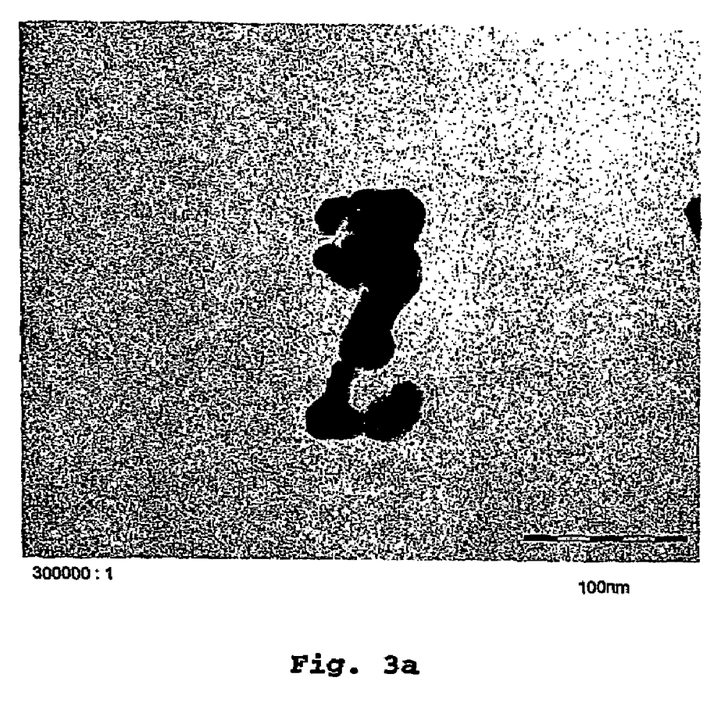
FIGS. 3a-d. Show linear, branched, ellipsoidal and circular aggregate, respectively, of the powder.
Figure 3B:
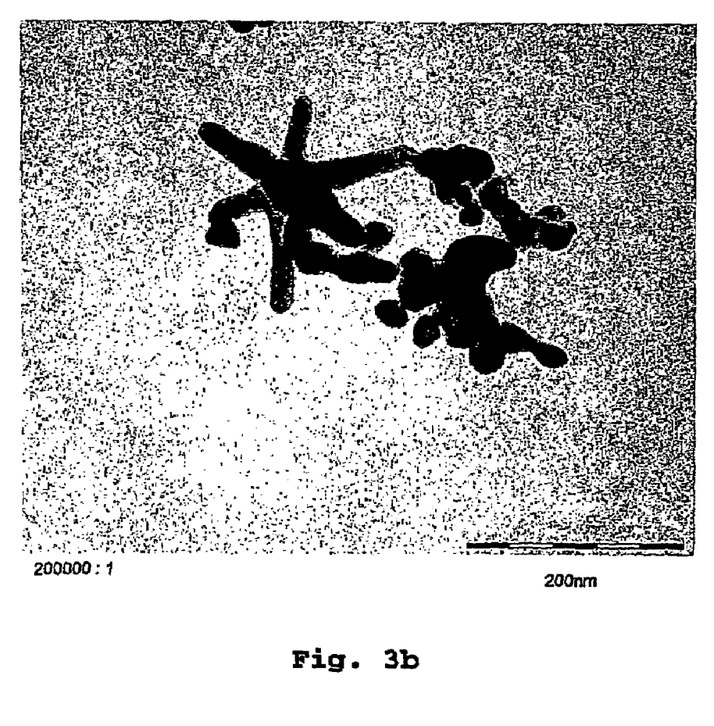
Figure 3C:
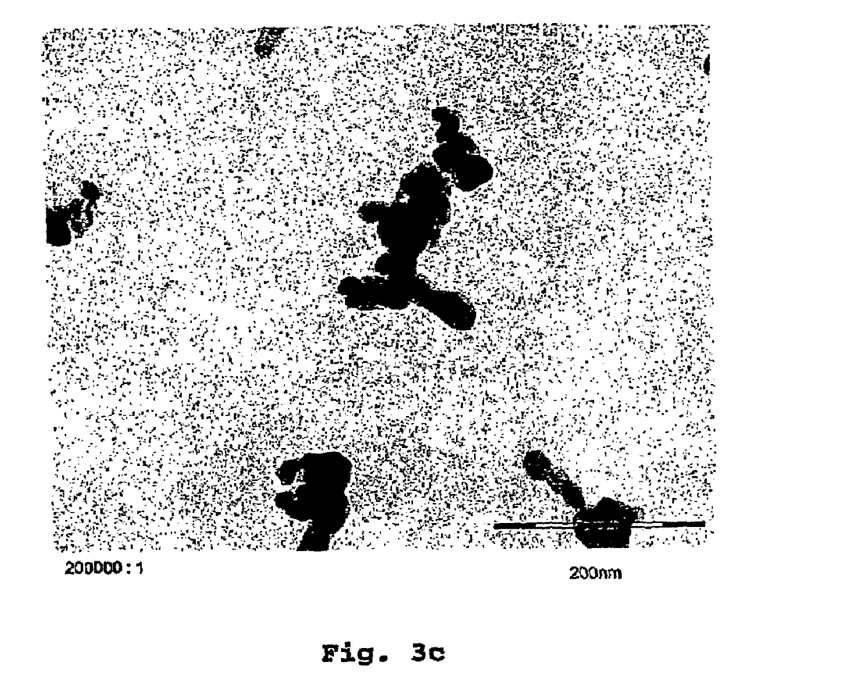
Figure 3D:
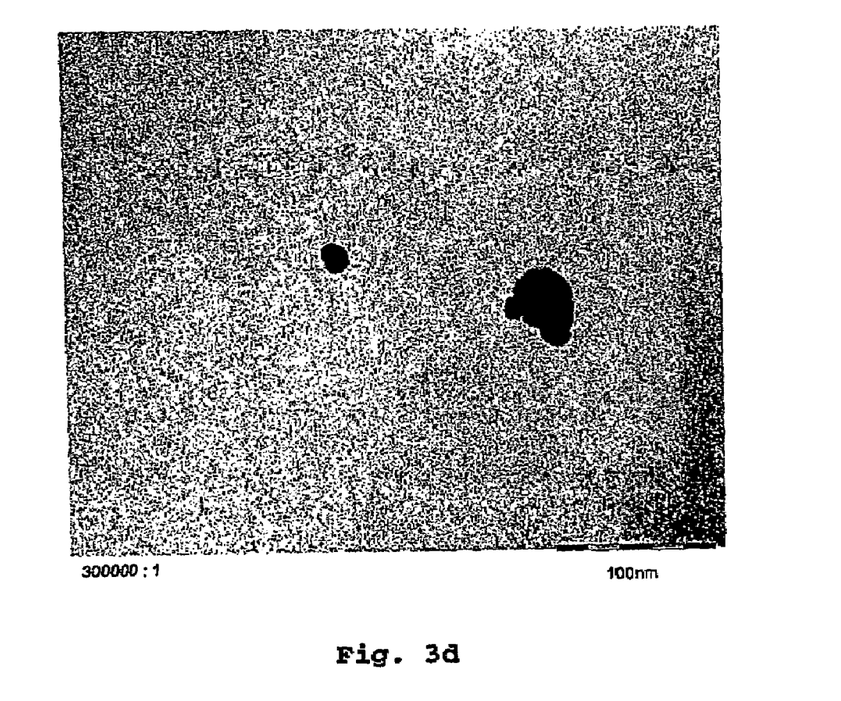

Preference may be given to zinc oxide powders which contain an approximately equal amount of from 30 to 40% of ellipsoidal and linear forms and a smaller amount of branched forms of from 20 to 25% and of circular forms of from 2 to 6%. FIG. 2 shows a TEM image of the powder according to the invention, and FIGS. 3a-d show a linear, branched, ellipsoidal and circular aggregate, respectively, of that powder.

The zinc oxide powder according to the invention may also have a tamped density, determined according to DIN ISO 787/11, of at least 150 g/l. A tamped density of from 250 to 350 g/l may be particularly preferred.

It is also possible for the zinc oxide powder according to the invention to consist of aggregates that have a mean projected aggregate surface area of less than 10,000 nm$^2$, an equivalent circle diameter (ECD) of less than 100 nm and a mean circumference of less than 600 nm. These values can be obtained by image analysis of approximately from 1000 to 2000 aggregates from TEM images.

Particular preference may be given to zinc oxide powders having a mean projected aggregate surface area of from 2000 to 8000 nm$^2$, an equivalent circle diameter (ECD) of from 25 to 80 nm and a mean circumference of from 200 to 550 nm.

In particular when using zinc oxide powder in cosmetic and pharmaceutical preparations, it is important to minimise harmful impurities. These include especially lead, cadmium, arsenic, iron, antimony and mercury.

The zinc oxide powder according to the invention may contain not more than 20 ppm of lead, not more than 3 ppm of arsenic, not more than 15 ppm of cadmium, not more than 200 ppm of iron, not more than 1 ppm of antimony and not more than 1 ppm of mercury, in each case based on zinc oxide.

The invention further provides a process for the preparation of the zinc oxide powder according to the invention, which process is characterised in that a starting mixture containing zinc vapour, a combustible gas and the reaction products from the oxidation of the combustible gas with an oxygen-containing gas is reacted in a flame with an oxygen-containing gas in an oxidation zone, the hot reaction mixture is cooled in a quenching zone and the solid material is separated from the gas stream, the amount of oxygen in the oxidation zone being greater than the amount necessary for the complete oxidation of the combustible gas and the zinc vapour.

The manner in which the zinc vapour is provided is not limited. For example, zinc powder or another zinc compound that yields zinc when subjected to heat treatment can be vaporised in a vaporiser and fed by means of a stream of inert gas into the apparatus containing the starting mixture. The starting mixture also contains a combustible gas, which may be hydrogen, methane, ethane or propane or a mixture thereof, hydrogen being preferred. Also present in the starting mixture are steam and/or carbon dioxide, the reaction products from the combustion of the combustible gas. The starting mixture may preferably contain steam.

The mixture of zinc vapour, combustible gas and steam or steam/carbon dioxide, and also other inert gases, for example nitrogen, is transferred to an oxidation zone, where it reacts in a flame with an oxygen-containing gas in an oxidation zone. The amount of oxygen in the oxidation zone is greater than the amount necessary for the complete oxidation of the combustible gas and the zinc vapour. In the oxidation zone, the oxidation of the combustible gas, for example hydrogen, according to Eq. 1 and the oxidation of the zinc vapour according to Eq. 2 take place in parallel.

Eq. 1

Eq. 2

Figure 4:
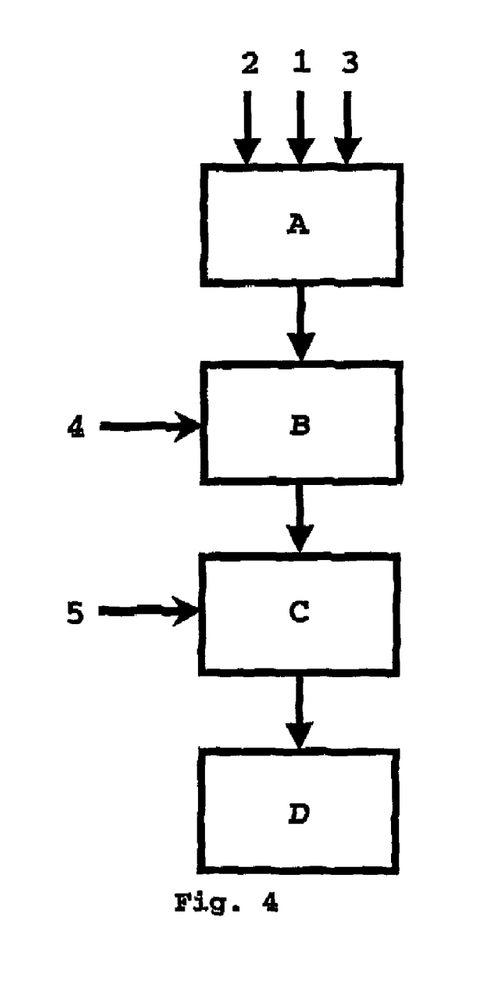
FIG. 4. Shows the sequence of the process according to the invention in diagrammatic form.

FIG. 4 shows the sequence of the process according to the invention in diagrammatic form. In the Figure: A=starting mixture; B=oxidation zone; C=quenching zone; D=separation of solid material; 1=zinc vapour; 2=combustible gas; 3=water or water/carbon dioxide; 4=oxidising air; 5=quenching air. Although water is formed in the oxidation of the combustible gas in the oxidation zone, the presence of water and/or carbon dioxide in the starting mixture has been found to be essential for the formation of the zinc oxide particles according to the invention. Water is preferred. Water and/or carbon dioxide can result, for example, from the oxidation of a combustible gas using oxygen.

The molar ratio of water to zinc vapour may preferably be from 15:1 to 35:1 and particularly preferably from 20:1 to 30:1.

It is also advantageous if the molar ratio of combustible gas to zinc vapour in the starting mixture is from 5:1 to 25:1. A ratio of from 10:1 to 20:1 is particularly advantageous.

When the starting mixture enters the oxidation zone, it may be advantageous for the molar ratio of oxygen to combustible gas to be from 3:1 to 20:1. A ratio of from 6:1 to 15:1 may be particularly advantageous.

When the starting mixture enters the oxidation zone, it may further be advantageous for the molar ratio of oxygen to zinc vapour to be from 5:1 to 30:1. A ratio of from 10:1 to 20:1 may be particularly advantageous.

The temperature of the starting mixture may be from 920° C. to 1250° C.

In a preferred embodiment of the process according to the invention, zinc vapour can be obtained in a reductive vaporisation zone by vaporising zinc powder by means of a stream of inert gas in a centrally arranged pipe by means of a flame arranged around the centrally disposed pipe, which flame is generated by reaction of a combustible gas and an oxygen-containing gas, the combustible gas being present in a stoichiometric excess relative to the oxygen content of the oxygen-containing gas.

In a particularly preferred embodiment of the process, the centrally arranged pipe is so adjusted that contact with the flame is avoided. A reductive vaporisation zone within the scope of the invention is understood as being a zone in which there prevails an atmosphere that is deficient in oxygen. This prevents the zinc powder from being oxidised even before the vaporisation.

The molar ratio of combustible gas to the oxygen content of the oxygen-containing gas in the reductive vaporisation zone may preferably be from 1.5:1 to 3.5:1 and particularly preferably from 2:1 to 2.5:1.

The invention provides a further process for the preparation of the zinc oxide powder according to the invention, which process is characterised in that zinc powder is vaporised inside a reactor and oxidised to zinc oxide, wherein in a reductive vaporisation zone, zinc powder is metered with the aid of a stream of inert gas into a centrally arranged pipe which projects into the vaporisation zone of the reactor, is vaporised by means of an externally arranged flame which is generated by reaction of a combustible gas with an oxygen-containing gas, the combustible gas and the oxygen-containing gas being supplied in pipes arranged concentrically around the central pipe, and the centrally arranged pipe being longer than the pipes arranged concentrically around it, and the combustible gas being present in a stoichiometric excess relative to the oxygen content of the oxygen-containing gas, and then an excess of oxygen in the form of an oxygen-containing gas is fed into the gas stream from the reductive vaporisation zone, so that the excess combustible gas and the zinc vapour from the vaporisation zone are oxidised completely in the oxidation zone, then the hot reaction mixture is cooled in a quenching zone and the solid material is separated from the gas stream.

Figure 5:
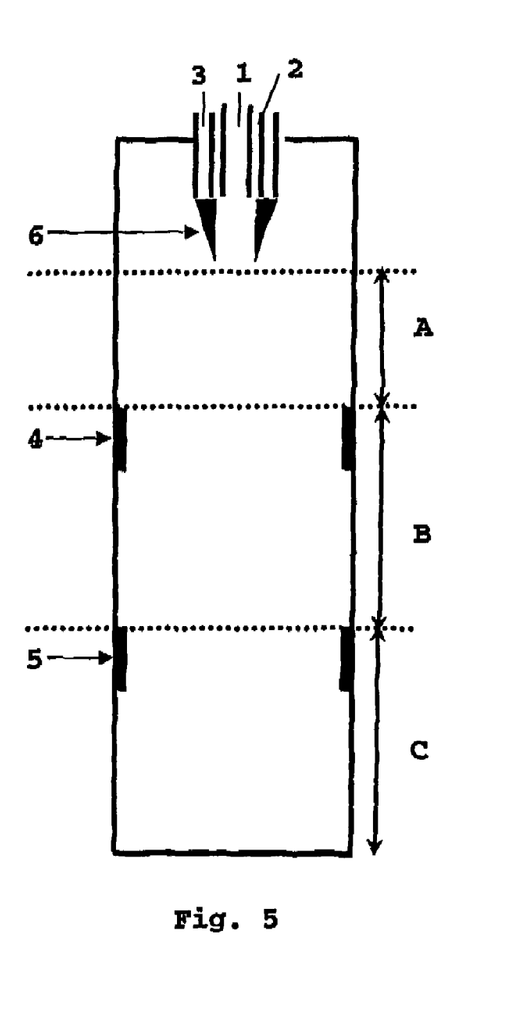
FIG. 5. Shows the apparatus for carrying out this process in diagrammatic form.

FIG. 5 shows the apparatus for carrying out this process in diagrammatic form. In the Figure: A=reductive vaporisation zone; B=oxidation zone; C=quenching zone; 1=zinc powder+inert gas; 2=combustible gas, preferably hydrogen; 3=air; 4=oxidising air; 5=quenching air; 6=concentrically arrange pipe structure.

The process according to the invention can preferably be carried out in such a manner that the molar ratio of combustible gas to the oxygen content of the oxygen-containing gas in the reductive vaporisation zone is from 1.5:1 to 3.5:1. This ratio may particularly preferably be from 2:1 to 2.5:1.

It may also be preferable for the molar ratio of oxygen to combustible gas on entry into the oxidation zone to be preferably from 3:1 to 20:1 and particularly preferably from 6:1 to 15:1.

It may also be advantageous for the molar ratio of oxygen to zinc vapour on entry into the oxidation zone to be from 5:1 to 30:1. A ratio of from 10:1 to 20:1 may be particularly advantageous.

In order to achieve high purity of the zinc oxide powder, it is advantageous to use highly pure zinc powder as the starting material.

High purity is understood as meaning a purity of at least 99%, in the case of special requirements a purity of at least 99.9%. In the case of a zinc oxide powder for cosmetic or pharmaceutical use in particular, attention is to be given to the amounts of lead (not more than 20 ppm), arsenic (not more than 3 ppm), cadmium (not more than 15 ppm), iron (not more than 200 ppm), antimony (not more than 1 ppm) and mercury (not more than 1 ppm).

In the processes according to the invention, the temperature of the mixture to be oxidised on entering the oxidation zone is preferably from 920° C. to 1250° C.

It may also be advantageous to limit the residence time of the reaction mixture in the oxidation zone to from 5 milliseconds to 200 milliseconds, a range of from 10 milliseconds to 30 milliseconds being particularly advantageous.

The temperature in the quenching zone immediately before the addition of the quenching air may preferably be from 600° C. to 850° C., and the rate of cooling in the quenching zone may be from 1000 Kelvin/second to 50,000 Kelvin/second.

The invention relates also to the use of the zinc oxide powder according to the invention as a constituent of sun protection compositions for protection against UV radiation, as a vulcanisation aid, in plastics and surface coatings as a UV absorber, as a crosslinking agent or catalyst in the curing or polymerisation of plastics or plastics monomers, in synthetic resins, in pharmaceutical and cosmetic preparations as an antifungal or antibacterial additive, in the preparation of ceramics, as a catalyst or catalyst support.

EXAMPLES

Analytical Methods

The BET surface area is determined according to DIN 66131.

The TEM images are obtained using a Hitachi TEM device, type H-75000-2. By means of the CCD camera of the TEM device and subsequent image analysis, approximately from 1000 to 2000 aggregates are evaluated. The parameters are defined in accordance with ASTM 3849-89. Analysis of the form of the aggregates according to circular, ellipsoidal, linear and branched is carried out according to Herd et al., Rubber, Chem. Technol. 66 (1993) 491.

The tamped density is determined according to DIN ISO 787/11.

Example 1

Example 1 is carried out in a reactor according to FIG. 4.

Zinc powder (510 g/h) is conveyed by means of a stream of nitrogen (4.2 $Nm^3/h$) into a reductive vaporisation zone in which a hydrogen/air flame (hydrogen: 4.0 $Nm^3/h$, air: 8.0 $Nm^3/h$) is burning. The zinc powder is thereby vaporised.

The reaction mixture comprising zinc vapour, hydrogen, nitrogen and water flows into the oxidation zone, into which 20 $Nm^3/h$ of air is added.

The temperature T1 before addition of the oxidising air is 956° C. Then 10 Nm/h of quenching air are added. The temperature T2 before addition of the quenching air is 648° C. The resulting zinc oxide powder is separated from the gas stream by filtration.

Examples 2 to 4 are carried out analogously to Example 1. The process parameters are to be found in Table 1.

Example 5

Comparison Example

Zinc powder (250 g/h) is conveyed by means of a stream of nitrogen (1.5 $Nm^3/h$) into a vaporisation zone in which a hydrogen/air flame (hydrogen: 4.25 $Nm^3/h$, air: 8.40 $Nm^3/h$) is burning. The zinc powder is thereby vaporised.

The reaction mixture comprising zinc vapour, hydrogen, nitrogen and water is then cooled to a temperature of 850° C. in a nucleation zone by the metered addition of 1 $Nm^3/h$ of nitrogen. 5 $m^3/h$ of oxidising air and 34 $Nm^3/h$ of quenching air are then added, the reaction temperature falling to values of less than 400° C. The resulting zinc oxide powder is separated from the gas stream by filtration.

Example 5 is to be found in the patent application having the application number DE 10212680 of 22.03.2002.

Example 6

(Comparison example) is a commercially available zinc Oxide powder from Nanophase, NanoTek® Zinc Oxide 99+%.

The process parameters for the preparation of the zinc oxide powders of Examples 1 to 4 are to be found in Table 1. The physico-chemical data of the zinc oxide powders of Examples 1 to 6 are to be found in Table 2.

Table 2 shows that the powders according to the invention of Examples 1 to 4 exhibit the claimed distribution of the aggregate forms into circular, linear, branched and ellipsoidal forms. The powders of Comparison Examples 5 and 6 do not exhibit this distribution.

The equivalent circle diameter (ECD) of the powders according to the invention of Examples 1 to 4 is less than 100 nm, the mean aggregate circumference is less than 600 nm and the mean aggregate surface area is less than 7500 $nm^2$.

FIGS. 3a-d show a linear, branched, ellipsoidal and circular aggregate, respectively, of the powder of Example 3.

The powder according to the invention can readily be incorporated into sun protection formulations. It exhibits high transparency and high UV protection.

TABLE 1

Process parameters in the preparation of ZnO

| | | Example 1 | Example 2 | Example 3 | Example 4 |
|---|---|---|---|---|---|
| *Reductive vaporisation zone* | | | | | |
| Zn powder | g/h | 510 | 500 | 520 | 250 |
| | mol/h | 7.80 | 7.65 | 7.95 | 3.82 |
| $H_2$ | $Nm^3/h$ | 4.0 | 4.0 | 5.0 | 4.0 |
| | mol/h | 178.45 | 178.45 | 223.06 | 178.45 |
| Air | $Nm^3/h$ | 8.0 | 6.8 | 10.0 | 8.0 |
| | mol $O_2$/h | 74.95 | 49.65 | 93.69 | 74.95 |
| $H_2O$ from $H_2 + O_2$ | mol/h | 178.45 | 178.45 | 223.06 | 178.45 |
| Carrier gas $N_2$ | $Nm^3/h$ | 4.2 | 4.20 | 4.2 | 5.0 |
| | mol/h | 187.37 | 187.37 | 187.37 | 223.11 |
| Excess of $H_2$ | mol/h | 28.55 | 51.04 | 35.69 | 28.55 |
| $H_2/O_2$ | | 2.38 | 2.80 | 2.38 | 2.38 |
| $H_2/Zn$ | | 13.27 | 15.00 | 16.26 | 27.06 |
| $H_2O/Zn$ | | 22.87 | 23.33 | 28.04 | 46.66 |
| Temperature T1* | °C. | 956 | 980 | 1000 | 1060 |
| *Oxidation zone* | | | | | |
| Air | $Nm^3/h$ | 20.0 | 16.0 | 15.0 | 25.0 |
| | mol $O_2$/h | 187.37 | 149.90 | 140.53 | 233.82 |
| $O_2/H_2$** | | | 13.13 | 5.87 | 7.88 | 16.41 |
| $O_2/Zn$** | | | 24.02 | 19.60 | 17.67 | 61.24 |
| Temperature T2* | °C. | 648 | 718 | 746 | 758 |
| *Quenching zone* | | | | | |
| Air | $Nm^3/h$ | 10.0 | 24.0 | 22.0 | 22.0 |
| | mol/h | 93.69 | 224.85 | 206.11 | 206.11 |

*T1: temperature of the reaction mixture immediately before entering the oxidation zone;
T2: temperature of the reaction mixture immediately before addition of the quenching air;
**$O_2/H_2$: stoichiometrically required amount for oxidation of H2;
$O_2/Zn$: stoichoimetrically required amount for oxidation of Zn

TABLE 2

Physico-chemical data of the zinc oxide powders

| | | Examples according to the invention | | | | Comparison examples | |
|---|---|---|---|---|---|---|---|
| Example | | 1 | 2 | 3 | 4 | 5 | 6 |
| BET surface area | $m^2/g$ | 27 | 25 | 25 | 75 | 20 | 16 |
| Number of aggregates | | 1877 | 1477 | 1147 | 2055 | 1466 | 1237 |
| Proportion of aggregates | | | | | | | |
| circular | % | 4 | 3 | 5 | 9 | 7 | 10 |
| ellipsoidal | | 37 | 36 | 36 | 44 | 54 | 52 |
| linear | | 36 | 37 | 34 | 26 | 23 | 23 |
| branched | | 23 | 24 | 25 | 21 | 16 | 19 |
| Mean aggregate surface area | $nm^2$ | 4941 | 6835 | 7450 | 2470 | 15762 | 25360 |
| Equivalent circle diameter of the aggregates | nm | 66 | 75 | 82 | 33 | 133 | 146 |
| Mean aggregate circumference | nm | 445 | 497 | 526 | 222 | 759 | 790 |
| Tamped density | g/l | 316 | 224 | 235 | 210 | n.d. | n.d. |

*n.d. = not determined;

The invention claimed is:

1. Pyrogenically prepared zinc oxide powder having a BET surface area of from 10 to 200 $m^2/g$, characterised in that
   it is in the form of aggregates,
   the aggregates being composed of particles having different morphologies, and
   0-10% of the aggregates being in a circular form,
   30-50 % of the aggregates being in an ellipsoidal form,
   30-50 % of the aggregates being in a linear form,
   20-30 % of the aggregates being in a branched form.

2. Pyrogenically prepared zinc oxide powder according to claim 1, characterised in that the tamped density, determined according to DIN ISO 787/11, is at least 150 g/l.

3. Pyrogenically prepared zinc oxide powder according to claim 1, characterised in that the aggregates have
   a mean projected aggregate surface area of less than 10,000 $nm^2$
   an equivalent circle diameter (ECD) of less than 100 nm and
   a mean circumference of less than 600 nm.

4. Pyrogenically prepared zinc oxide powder according to claim 1, characterised in that the amount of lead is not more than 20 ppm, the amount of arsenic is not more than 3 ppm, the amount of cadmium is not more than 15 ppm, the amount of iron is not more than 200 ppm, the amount of antimony is not more than 1 ppm and the amount of mercury is not more than 1 ppm.

5. Process for the preparation of the zinc oxide powder according to claim 1, characterised in that
   a starting mixture containing zinc vapor, a combustible gas and steam or a mixture of steam and carbon dioxide is reacted in a flame with an oxygen-containing gas in an oxidation zone,
   the hot reaction mixture is cooled in a quenching zone and the solid material is separated from the gas stream,
   the amount of oxygen in the oxidation zone being greater than the amount necessary for the complete oxidation of the combustible gas and the zinc vapor.

6. Process according to claim 5, characterised in that the zinc vapor is obtained in a reductive vaporization zone by vaporizing zinc powder by means of a stream of inert gas in a centrally arranged pipe by means of an externally arranged flame which is generated by reaction of a combustible gas and an oxygen-containing gas, the combustible gas being present in a stoichiometric excess relative to the oxygen content of the oxygen-containing gas.

7. Process for the preparation of the zinc oxide powder according to claim 1, characterised in that the vaporization of the zinc powder and the oxidation to zinc oxide are carried out inside a reactor, wherein
   in a reductive vaporization zone, zinc powder is metered in a centrally arranged pipe by means of a flame arranged around the centrally disposed pipe, in which the flame is generated by reaction of a combustible gas with an oxygen-containing gas,
   the combustible gas and the oxygen-containing gas being supplied in separate pipes arranged concentrically around the central pipe, and
   the combustible gas being present in a stoichiometric excess relative to the oxygen content of the oxygen-containing gas,
   and then an excess of oxygen in the form of an oxygen-containing gas is fed into the gas stream from the reductive vaporization zone, so that the excess combustible gas and the zinc vapor from the vaporization zone are oxidised completely in the oxidation zone, then the hot reaction mixture is cooled in a quenching zone and the solid material is separated from the gas stream.

8. A sun protection composition for protection against UV radiation comprising the pyrogenically prepared zinc oxide powder according to claim 1.

* * * * *